US008260825B2

(12) United States Patent
Cras et al.

(10) Patent No.: US 8,260,825 B2
(45) Date of Patent: Sep. 4, 2012

(54) FUNCTIONALLY-DEPENDENT ANALYSIS OBJECTS

(75) Inventors: Jean-Yves Cras, Paris (FR); Serge Thepaut, Ermont (FR); Gilles Vergnory-Mion, Vaucresson (FR); Juan Francisco Calvente, Paris (FR)

(73) Assignee: Business Objects Software Limited, Dublin (IE)

( * ) Notice: Subject to any disclaimer, the term of this patent is extended or adjusted under 35 U.S.C. 154(b) by 489 days.

(21) Appl. No.: 12/463,702

(22) Filed: May 11, 2009

(65) Prior Publication Data

US 2010/0287223 A1    Nov. 11, 2010

(51) Int. Cl.
*G06F 17/30* (2006.01)
(52) U.S. Cl. ........ 707/803; 707/779; 707/790; 707/792; 707/955; 707/959
(58) Field of Classification Search ........... 707/999.103, 707/803, 955, 959, 779, 790, 792
See application file for complete search history.

(56) References Cited

U.S. PATENT DOCUMENTS

| | | | | | |
|---|---|---|---|---|---|
| 5,426,747 | A | * | 6/1995 | Weinreb et al. | 711/203 |
| 5,555,403 | A | * | 9/1996 | Cambot et al. | 1/1 |
| 5,627,979 | A | * | 5/1997 | Chang et al. | 715/763 |
| 5,734,887 | A | * | 3/1998 | Kingberg et al. | 1/1 |
| 5,765,159 | A | * | 6/1998 | Srinivasan | 1/1 |
| 5,937,402 | A | * | 8/1999 | Pandit | 1/1 |
| 6,101,502 | A | * | 8/2000 | Heubner et al. | 1/1 |
| 6,205,447 | B1 | * | 3/2001 | Malloy | 1/1 |
| 6,684,207 | B1 | * | 1/2004 | Greenfield et al. | 1/1 |
| 6,928,431 | B2 | * | 8/2005 | Dettinger et al. | 1/1 |
| 7,313,561 | B2 | * | 12/2007 | Lo et al. | 1/1 |
| 7,546,226 | B1 | * | 6/2009 | Yeh et al. | 703/2 |
| 7,606,829 | B2 | * | 10/2009 | Dettinger et al. | 1/1 |
| 7,904,415 | B2 | * | 3/2011 | Khatchatrian et al. | 707/600 |
| 2009/0019022 | A1 | * | 1/2009 | Schallert et al. | 707/4 |

OTHER PUBLICATIONS

Chaudhuri, Surajit, et al., "An Overview of Data Warehousing and OLAP Technology", ACM SIGMOD Record, vol. 26, Issue 1, Mar. 1997, pp. 65-74.*
Pedersen, Torben Bach, et al., "Multidimensional Database Technology", Computer, IEEE Computer Society, vol. 34, Issue 12, Dec. 2001, pp. 40-46.*
Keller, Arthur M., et al., "Persistence Software: Bridging Object-Oriented Programming and Relational Databases", SIGMOD, Washington, DC, © 1993, pp. 523-528.*
Microsoft Computer Dictionary, 5th Edition, Microsoft Press, Redmond, WA, © 2002, pp. 141, 276, 300 and 510.*
Bertino, Elisa, et al., "Object-Oriented Database Management Systems: Concepts and Issues", Computer, IEEE Computer Society, vol. 24, Issue 4, Apr. 1991, pp. 33-47.*
Wrembel, Robert, et al., "Metadata Management in a Multiversion Data Warehouse", CoopIS/DOA/ODBASE 2005, LNCS 3761, Springer-Verlag, Berlin, Germany, © 2005, pp. 1347-1364.*

(Continued)

*Primary Examiner* — Thu-Nguyet Le
*Assistant Examiner* — Andalib Lodhi
(74) *Attorney, Agent, or Firm* — Buckley, Maschoff & Talwalkar LLC

(57) ABSTRACT

A system may include a database of physical data tables, a logical database schema of logical entities associated with the physical data tables, and an abstraction layer comprising a plurality of dimension objects mapped to the logical entities, at least one of the plurality of dimension objects comprising one or more properties associating the at least one of the plurality of dimension objects to one or more others of the plurality of dimension objects.

6 Claims, 13 Drawing Sheets

OTHER PUBLICATIONS

Döller, Mario, et al., "The MPEG-7 Multimedia Database System (MPEG-7 MMDB)", The Journal of Systems and Software, vol. 81, © 2008, pp. 1559-1580.*

Abelló, Alberto, et al., "Benefits of an Object-Oriented Multidimensional Data Model", Objects and Databases 2000, LNCS 1944, Springer-Verlag, Berlin, Germany, © 2001, pp. 141-152.*

Sotnykova, A., et al., "Semantic Mappings in Description Logics for Spatio-temporal Database Schema Integration", Journal on Data Semantics III, LNCS 3534, Springer-Verlag, Berlin, Germany, © 2005, pp. 143-167.*

Furtado, Camille, et al., "Physical and Virtual Partitioning in OLAP Database Clusters", SBAC-PAD 2005, Oct. 24-27, 2005, pp. 143-150.*

Huynh, Thanh N., et al., "Metadata for Object-Relational Data Warehouse", DMDW '2000, Stockholm, Sweden, Jun. 5-6, 2000, pp. 3-1 to 3-9.*

* cited by examiner

900

| Product |
|---|
| Id<br>Name<br>DesignCountryId |

| Country |
|---|
| Id<br>Name<br>Population<br>ContinentId |

| Continent |
|---|
| Id<br>Name |

FIG. 9

Geography

| Country | Continent |
|---|---|
| France | Europe |
| United Kingdom | Europe |
| U.S.A. | North America |

Production

| Product | Country of Design |
|---|---|
| Pen | France |
| Bike | France |
| Computer | U.S.A. |
| Motorbike | U.S.A. |
| Dress | United Kingdom |

Sales Facts

| Product | Country of Sales | Sales Amount |
|---|---|---|
| Pen | U.S.A. | 1 |
| Pen | France | 1 |
| Bike | France | 1 |
| Computer | U.S.A. | 1 |
| Computer | France | 1 |
| Motorbike | U.S.A. | 1 |
| Dress | France | 1 |
| Dress | United Kingdom | 1 |

FIG. 11

Result

| Country (of sales and design) | Sales Amount |
|---|---|
| France | 2 |
| United Kingdom | 1 |
| U.S.A. | 2 |

FIG. 13

Result

| Geography (of sales and design) | Sales Amount |
|---|---|
| Europe | 4 |
|     France | 2 |
|     United Kingdom | 1 |
| North America | 2 |
|     U.S.A. | 2 |

FIG. 14

FUNCTIONALLY-DEPENDENT ANALYSIS OBJECTS

CROSS REFERENCE TO RELATED APPLICATIONS

This application is related to commonly-assigned U.S. patent application Ser. No. 12/463,757, entitled "Generation of Logical Database Schema Representation Based on Symbolic Business Intelligence Query" and filed on even date herewith.

BACKGROUND

Business data is typically stored within physical tables of a database. The database may comprise a relational database, such as Oracle, Microsoft SQL Server, IBM DB2, Teradata and the like. Alternatively, the database could be a multi-dimensional database, an eXtendable Markup Language document, or any other structured data storage system.

The structures and relationships of the physical database tables are complex. A typical end user is therefore unable to locate or extract desired information from the physical database tables. Business Intelligence (BI) tools (e.g., BusinessObjects Universe Designer®) may be used to build an abstraction layer that shields end users from the complexity of the physical tables. More specifically, the abstraction layer allows the end users to query a database using intuitive terms rather than references to specific physical entities of the database.

U.S. Pat. No. 5,555,403 describes such an abstraction layer, referred to therein as a semantic layer. Briefly, a semantic layer defines a set of "business objects" that represent business entities, such as customers, time, financial figures, etc. Business objects may be classified as dimensions (along which one may want to perform an analysis or report), details (e.g., additional information on dimensions), and measures (e.g., indicators, most often numeric, whose value can be determined for a given combination of dimension values).

Dimension objects may be further abstracted into higher-level entities known as analysis objects. For example, the Country and City dimension objects may be child objects of a Geography analysis object, and a Product dimension object may be a child object of a Production analysis object. A dimension object may be referenced through its parent analysis object.

A user of a BI tool uses analysis objects of an abstraction layer to query underlying physical tables. Conventionally, the analysis objects (and their associated dimension objects) of an abstraction layer are considered orthogonal to one another. In other words, the abstraction layer provides the user with no indication of relationships between analysis objects (or dimension objects) which may actually exist in the underlying physical tables.

Microsoft SQL Server Analysis Services provide an abstraction layer including analysis objects (SSAS dimensions) and dimension objects (SSAS attributes). The Microsoft SQL Server Analysis Services abstraction layer allows declaration of functional dependencies between dimension objects (i.e., SSAS attributes), but only between the dimension objects that are associated with a same analysis object (i.e., SSAS dimension). Conversely, Microsoft SQL Server Analysis Services do not support functional dependencies between dimension objects (i.e., SSAS attributes) of different analysis objects (i.e., SSAS dimensions). Accordingly, as described above, analysis objects (i.e., SSAS dimensions) of Microsoft SQL Server Analysis Services are assumed to be orthogonal to one another.

FIG. 1 is a generic block diagram for further explaining an abstraction layer. Database 110, which may comprise any structured data storage, includes physical tables 115. Logical database schema 120 includes entities associated with some or all of physical tables 115, as well as additional entities, such as logical views and joins. Abstraction layer 130 includes business objects mapped to entities of logical database schema 120.

Consumer 140, which may comprise a reporting tool or any other system requiring access to the data of physical tables 110, views and interacts with the business objects (e.g., analysis objects, dimension objects) of abstraction layer 130. For example, consumer 140 may formulate a symbolic query using the business objects of abstraction layer 130. Query generator 150 may generate a query of database 110 based on the symbolic query and the mapping between logical database schema 120 and abstraction layer 130.

FIG. 2 illustrates database schema 200 of physical tables 115 according to one example. Schema 200 describes a database which stores information about customers who spend their holidays in resorts. Both the customers and the resorts are located in cities.

Database schema 200 presents a conventional "fan trap" problem because City table 210 is associated with several many-to-one relationships. If a business object name is mapped to the "City" table 210, and a user uses the business object to request "sales per city", the request would be considered ambiguous. More specifically, the request would not specify whether the user is requesting the amount of sales per city of customers, or the amount of sales per city of resorts.

To address the foregoing, a designer of a conventional system creates a logical alias of each logical table that is a "fan trap", and a logical alias of all tables to which the fan trap relates. Then, different user-friendly names will be associated to each of the aliased tables. For example, in view of schema 200, a designer using Business Objects' "Universe Designer" tool may create logical database schema 300 of FIG. 3, which includes logical aliases (310, 315) of City table 210 and logical aliases (320, 325) of Country table 220.

Creation of a logical alias does not require creation of corresponding physical tables or duplicate data. In the case of logical database schema 300, only one physical table remains for each of the City and Country tables of database schema 200, and each of the aliases is a logical view of one of these tables. The relationships from one aliased table to the other are properties of the alias, not of the physical table itself.

A designer of a corresponding abstraction layer may then simply associate a business object with each entity of the logical database schema. FIG. 4 is a block diagram of system 400 including database 410 of physical tables 415, which are assumed to conform to database schema 200. Logical database schema 420 is identical to logical database schema 300 and, as described above, abstraction layer 430 includes a business object associated with each entity of logical database schema 420.

Abstraction layer 430 allows a user to query, for instance, "sales by country of customer" without any ambiguity. However, abstraction layer 430 does not specify any functional dependencies between its dimension objects. Accordingly, abstraction layers such as abstraction layer 430 fail to provide a user with an intuitive understanding of the underlying relationships between their dimension objects.

What is needed is an efficient system to represent dependencies between analysis objects (and between dimension objects of different analysis objects) within an abstraction layer. Such a system may reduce a need to maintain complex static aliases or contexts, and may provide greater expressive power than current systems.

BRIEF DESCRIPTION OF THE DRAWINGS

FIG. 9 is a representation of a database schema.

FIG. 11 comprises tabular representations of physical data tables.

FIG. 13 is a representation of a query result based on the FIG. 12 abstraction layer and the FIG. 11 data tables according to some embodiments.

FIG. 14 is a representation of a query result based on the FIG. 12 abstraction layer and the FIG. 11 data tables according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
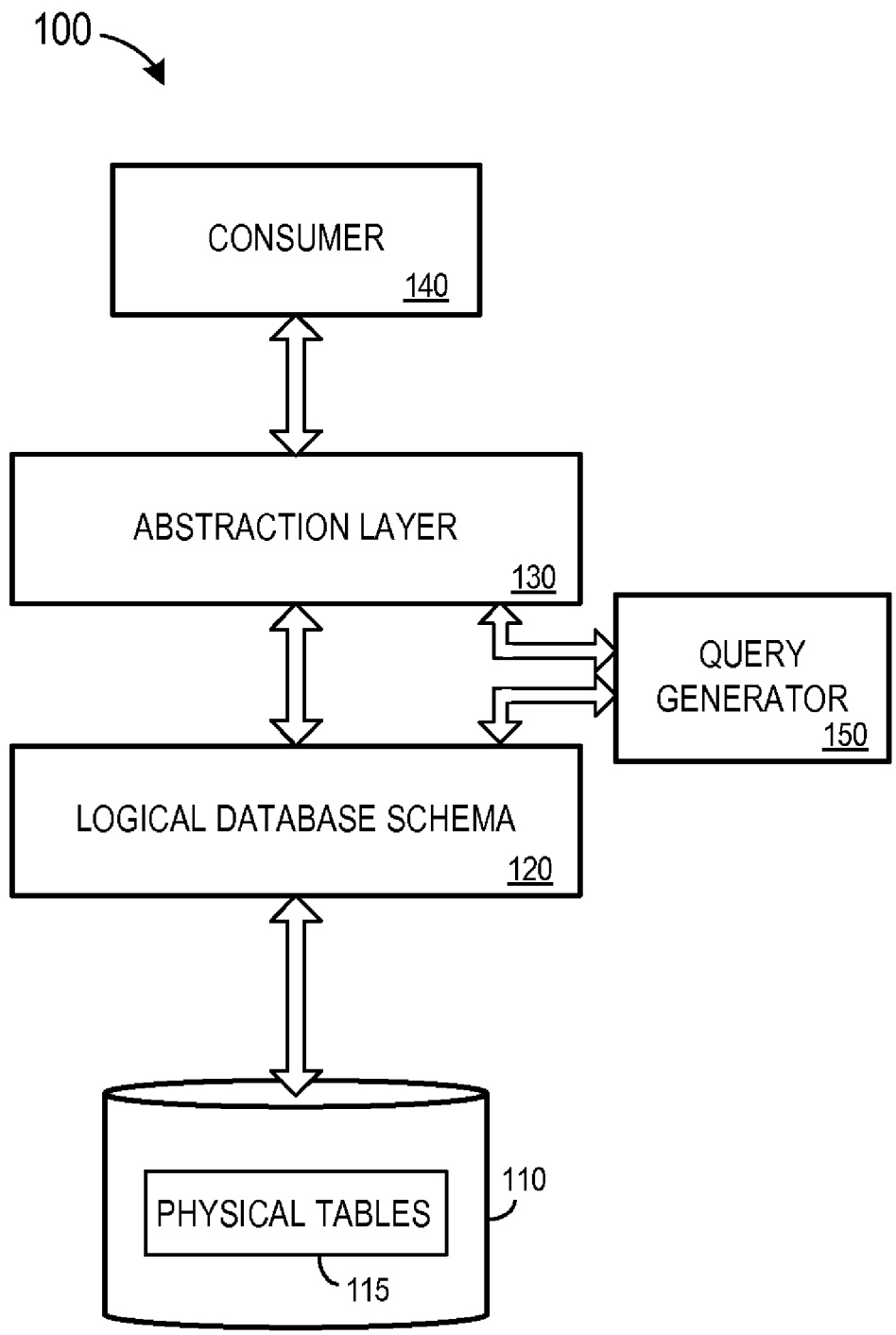
FIG. 1 is a block diagram of a system.
Figure 2:
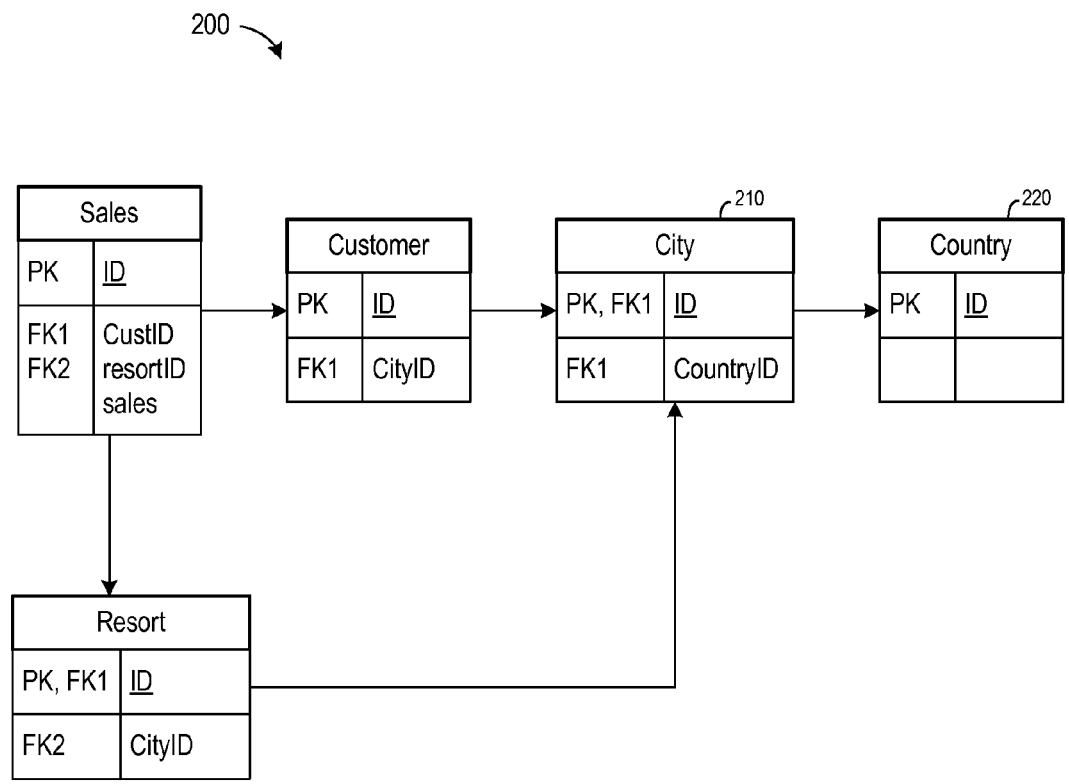
FIG. 2 is a representation of a database schema.
Figure 3:
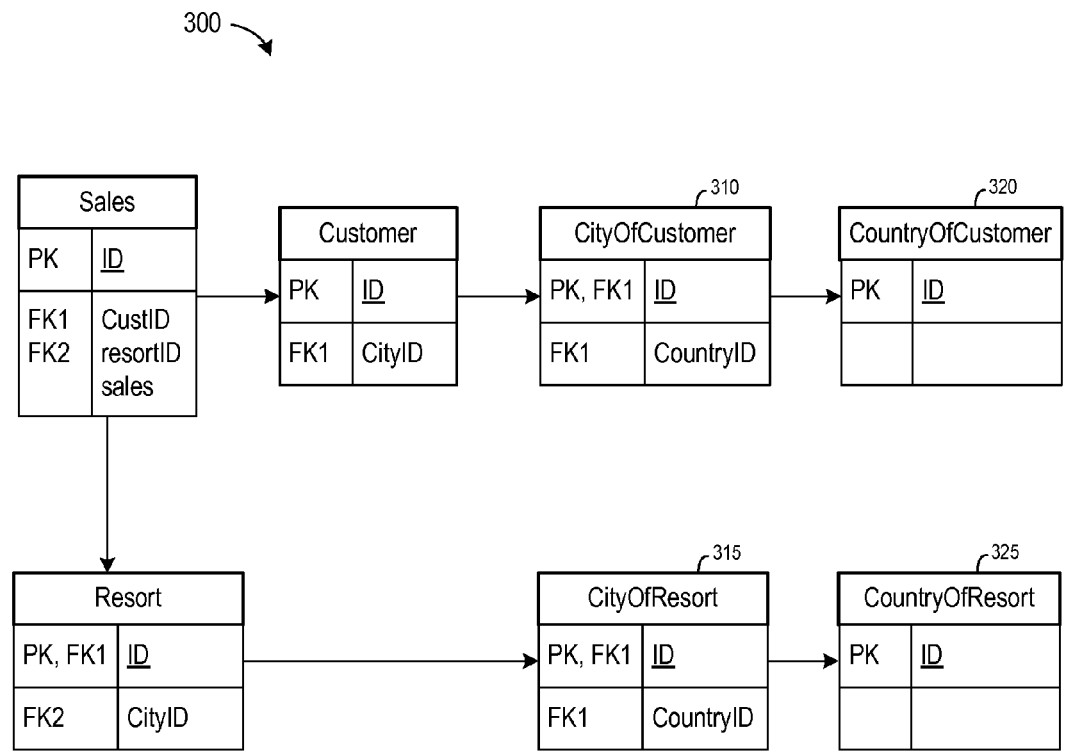
FIG. 3 is a representation of a prior art static logical database schema based on the FIG. 2 database schema.

Embodiments may be implemented according to an architecture such as that illustrated in FIG. 1. Database 110 may comprise any query-responsive data source or sources that are or become known, including but not limited to a relational database management system. Embodiments may operate in conjunction with any data source that can be modeled under an entity-relationship model to which entities and relationships can be added or removed dynamically.

Physical tables 115 of data source 110 may store business data of any sort in any form. Physical tables 115 conform to a physical database schema as described above. Logical database schema 120 includes entities associated with some or all of physical tables 115, as well as additional entities, such as logical views and joins. Abstraction layer 130 includes business objects, each of which may associate one or more entities stored in logical database schema 120 with user-friendly names.

Query generator 150 may receive a symbolic query from consumer 140 consisting of objects of abstraction layer 130. Query generator 150 may generate a query of database 110 (e.g., a series of SQL statements) based on the symbolic query, logical database schema 110, and on object properties specified in abstraction layer 130. Aforementioned U.S. patent application Ser. No. 12/463,757 provides detailed examples of query generation based on a symbolic query of an abstraction layer as described herein.

Each illustrated element of FIG. 1 may be implemented by any suitable combination of hardware and/or software. Each element may be located remotely from one or more other elements. More than one element may be implemented in a single device and/or software package. Logical database schema 120 and abstraction layer 130 may be provided by a computer executing program code stored on a non-transitory computer-readable medium. In some embodiments, logical database schema 120 and abstraction layer 130 are embodied within a single Business Objects Universe.

Advantageously, some embodiments provide an abstraction layer which expresses functional dependencies between two analysis objects (i.e. between dimension objects of the two analysis objects). These functional dependencies may be expressed through properties associated with dimension objects.

Figure 5:
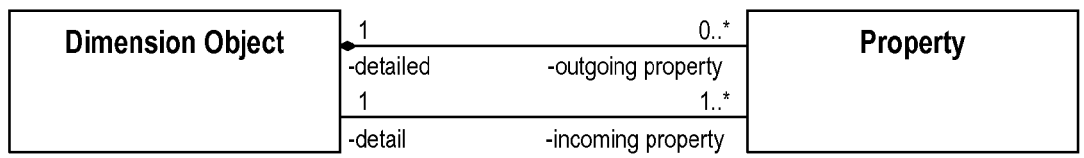
FIG. 5 is a UML class diagram according to some embodiments.

FIG. 5 is a UML class diagram of a dimension object and an associated property according to some embodiments. The dimension object is a named atomic entity for semantic definition and query specification, and the property is a named atomic entity for defining a many-to-one or a one-to-one relationship between two dimension objects. Generally, a set of dimension object instances related together by instances of properties according to FIG. 5 forms a functional dependency tree of an abstraction layer.

Figure 4:
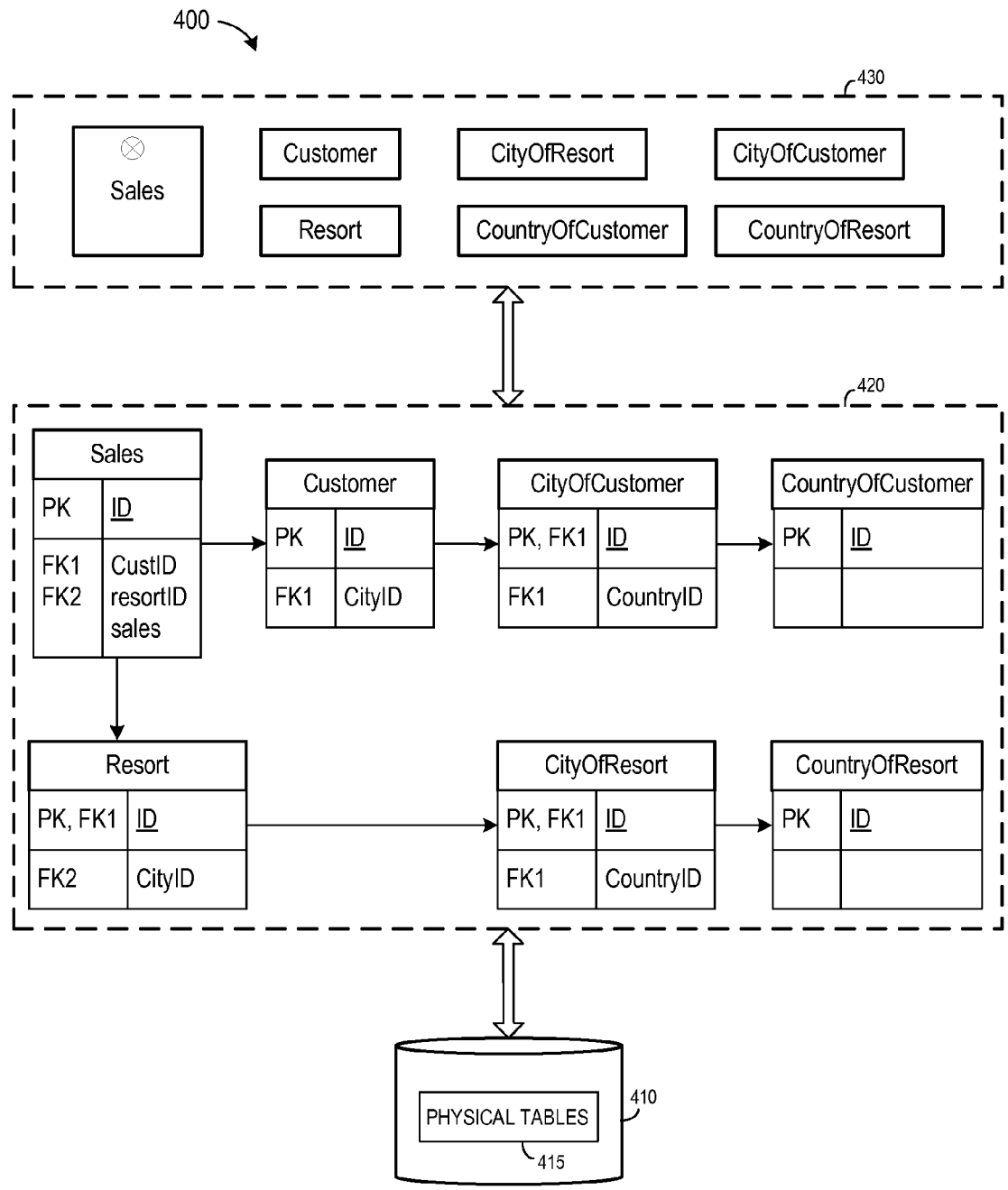
FIG. 4 is a block diagram of a system including the FIG. 3 logical database schema and an abstraction layer based on the FIG. 3 logical database schema.
Figure 6:
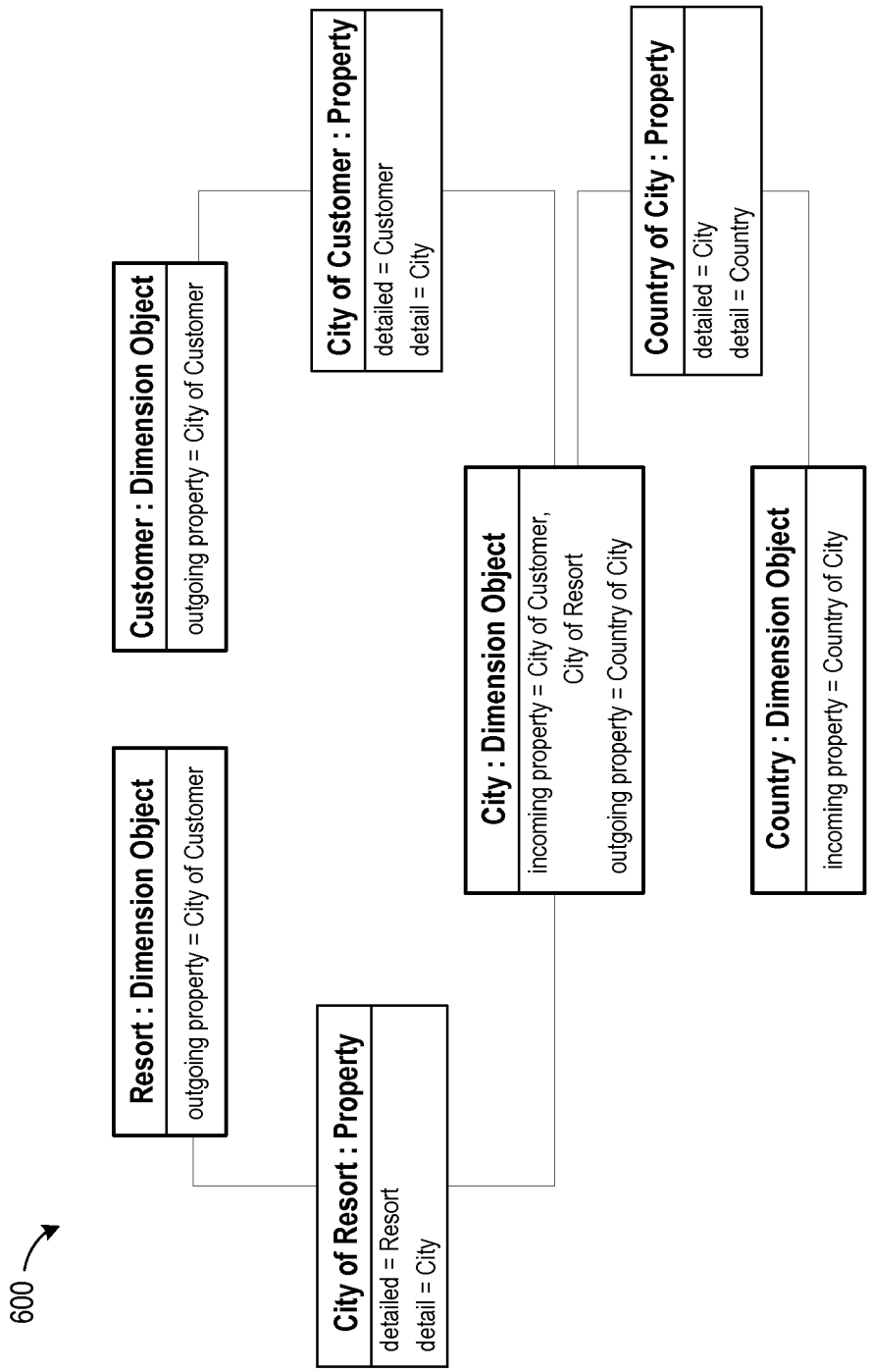
FIG. 6 is a representation of an abstraction layer corresponding to the FIG. 2 database schema and the FIG. 5 UML class diagram according to some embodiments.

FIG. 6 illustrates an example of such a tree. Tree 600 is an abstraction layer based on schema 200. In contrast to abstraction layer 430 of FIG. 4, tree 600 includes only one dimension object for each entity of schema 200, and specifies functional dependencies (via properties) associating each dimension object with one or more other dimension objects.

Figure 7:
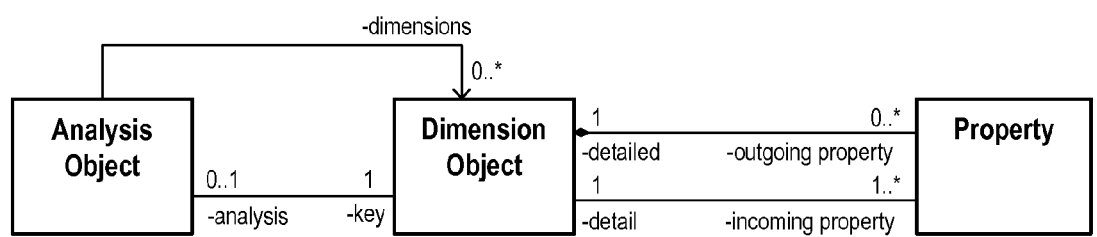
FIG. 7 is a UML class diagram according to some embodiments.

Analysis objects may be defined on top of a functional dependency tree according to some embodiments. FIG. 7 is a UML class diagram showing the interrelation between an analysis object and the FIG. 5 UML class diagram according to some embodiments. As shown, an analysis object references a dimension object of a functional dependency tree. Conversely, the dimension object is the key of the analysis object. The analysis object is able to provide all the dimension objects to which it is indirectly linked by traversing the dimension objects and properties of the functional dependency tree.

As in existing BI solutions, analysis objects of some embodiments are used to explicitly declare how measure objects are governed. However, unlike existing BI solutions, analysis objects are functionally-dependent because they are based on functionally-dependent dimension objects.

Figure 8:
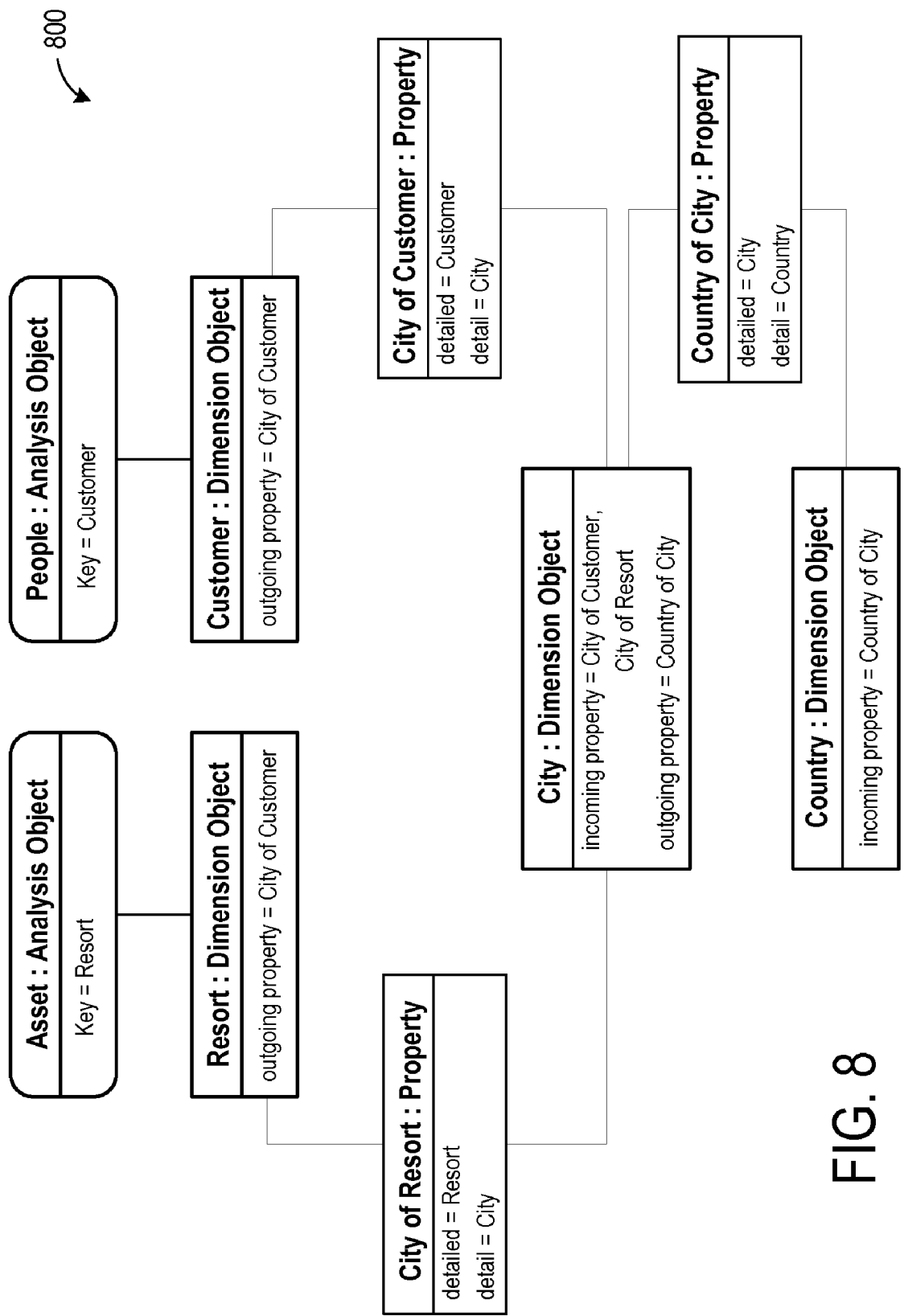
FIG. 8 is a representation of an abstraction layer corresponding to the FIG. 2 database schema and the FIG. 7 UML class diagram according to some embodiments.

FIG. 8 illustrates functional dependency tree 800 of an abstraction layer according to some embodiments. Tree 800 includes the dimension objects and properties of tree 600, as well as analysis objects related directly to two of the dimension objects as shown in the FIG. 7 UML class diagram. Specifically, the Asset analysis object has the Resort dimension object as a key and the People analysis object has the Customer dimension object as a key.

The Asset and People analysis objects are also indirectly related to the other dimension objects of tree 800 via associated properties. These other dimension objects (City, Country) may be keys of one or more respective analysis objects (e.g., a Geography analysis object). In the illustrated example, no dimension objects of the Asset and People analysis objects are directly related to one another via a property.

These dimension objects are instead related through properties associated with other dimension objects (i.e., of the Geography analysis object (not shown).

Embodiments may be employed to efficiently define a semantically rich abstraction layer on a data source. FIG. 9 illustrates schema 900 of a data source for purposes of example. As shown, the Product table includes a foreign key DesignCountryId to the Country table, and the Country table includes a foreign key ContinentId to the Continent table.

Figure 10:
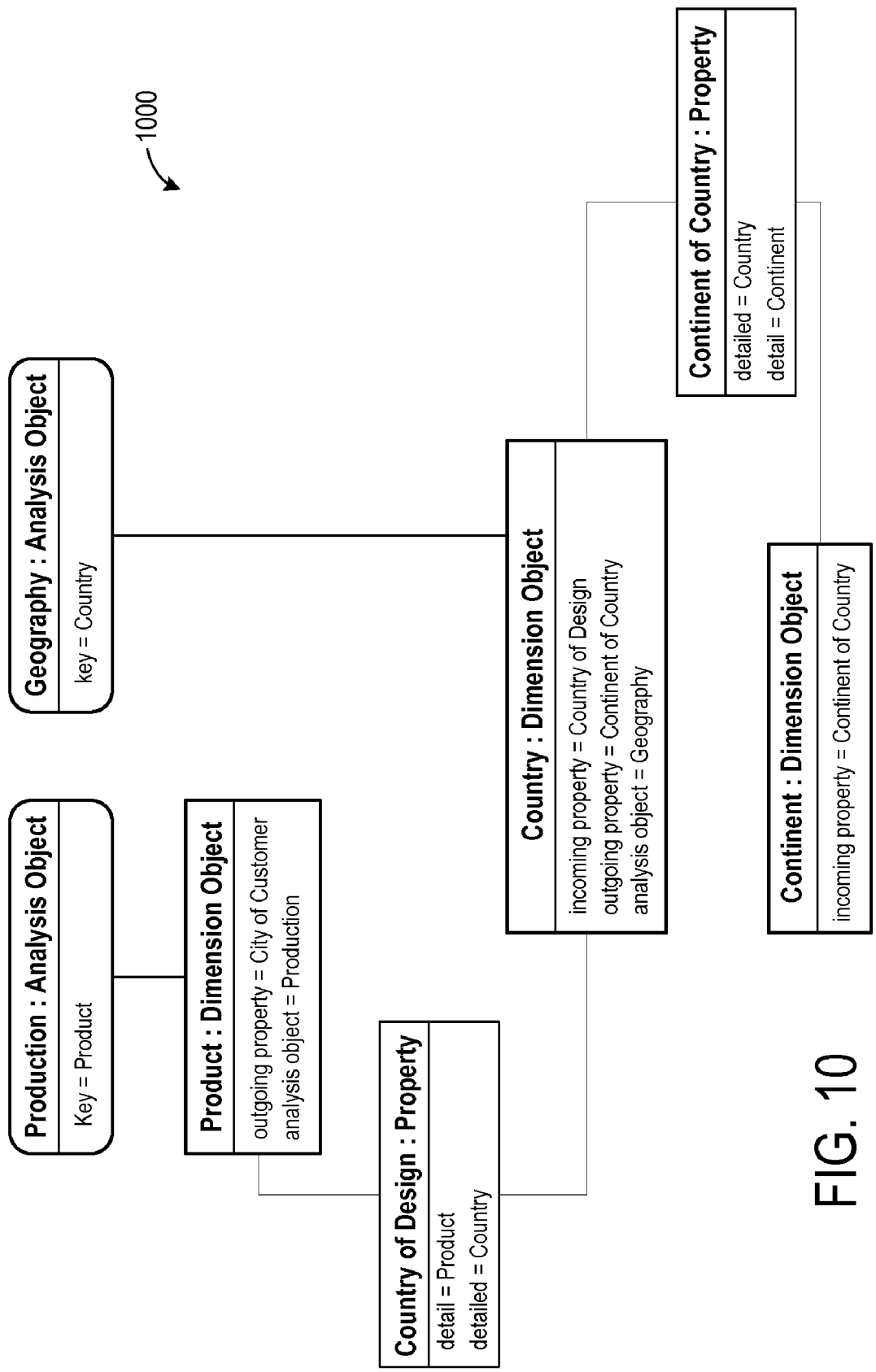
FIG. 10 is a representation of an abstraction layer corresponding to the FIG. 9 database schema and the FIG. 7 UML class diagram according to some embodiments.

FIG. 10 illustrates functional dependency tree 1000 of an abstraction layer built based on schema 900 according to some embodiments. A Product dimension object is associated with the Name column of the Product table, a Country dimension object is associated with the Name column of the Country table, and a Continent dimension object is associated with the Name column of the Continent table. Tree 1000 also includes a Country of Design property based on the DesignCountryId and Id columns of the Product table and the Country table, respectively, and a Continent of Country property based on the ContinentId and Id columns of the Country table and the Continent table, respectively. In the case of tree 1000, dimension objects of the Production and Geography analysis objects are directly related to one another via a property (i.e., the Country of Design property).

The functional dependencies provided by an abstraction layer according to some embodiments may be leveraged to define analysis queries. Since such functional dependencies between dimension objects enable navigation from one analysis object to another, the dimension objects may be used explicitly when a query is expressed in terms of dimension objects, or implicitly when the query is expressed in terms of analysis objects.

Figure 12:
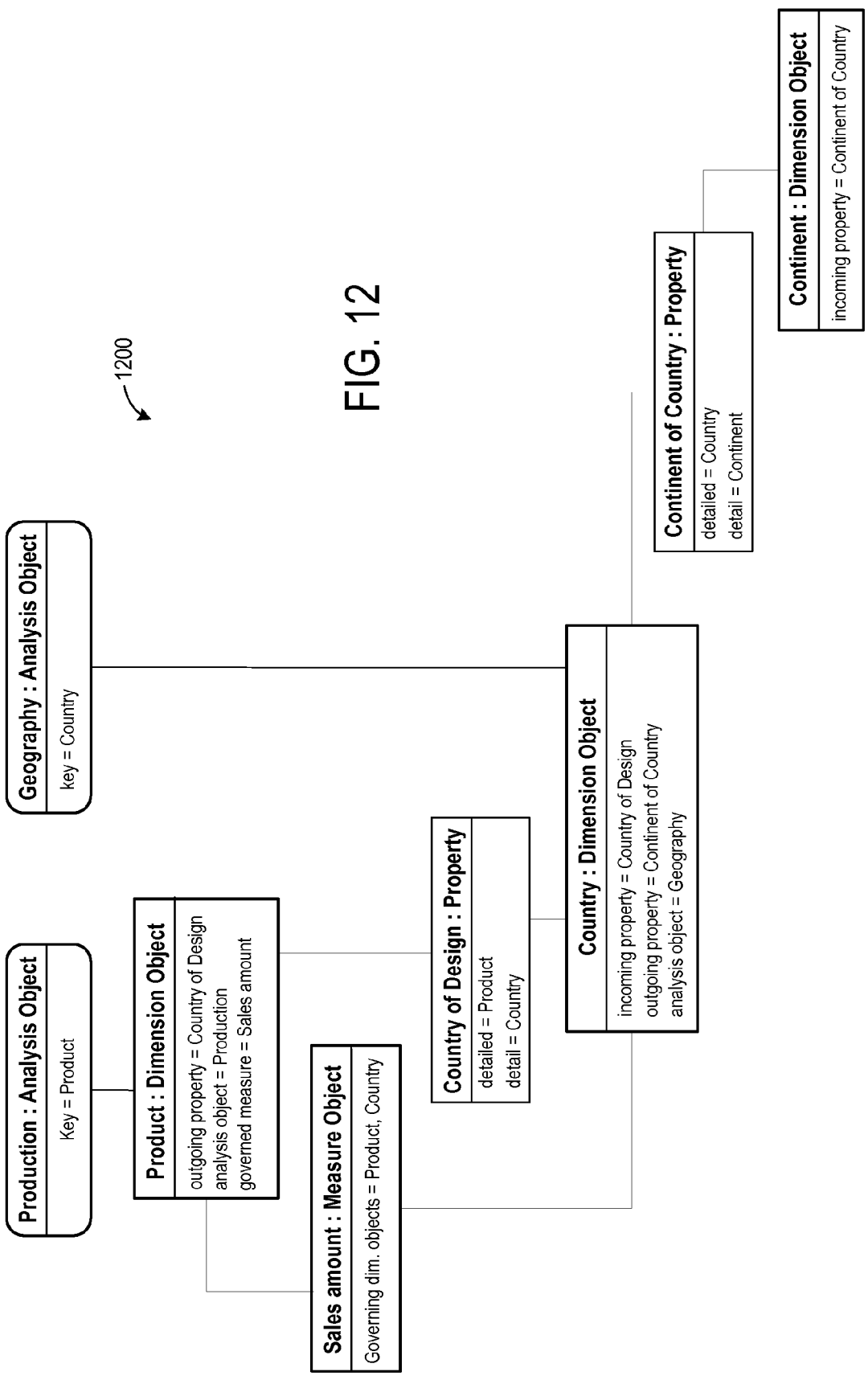
FIG. 12 is a representation of an abstraction layer corresponding to the FIG. 11 data tables and the FIG. 7 UML class diagram according to some embodiments.

FIG. 11 illustrates tabular representations of physical tables of a relational data source according to one example. Moreover, FIG. 12 illustrates tree 1200 of an abstraction layer defined on top of the relational data source. Tree 1200 includes two functionally-dependent analysis objects, Production and Geography. As shown, the Sales amount measure object is governed by the Product and Country dimension objects of the Production and Geography analysis objects.

The functional dependencies of tree 1200 can be leveraged to issue a dimension object-based query such as "select the sales amount of products in their design country". The functional dependencies may also or alternatively be leveraged to issue an analysis object-based query such as "select the sales amount of products in their design geography".

FIG. 13 exposes a result of the former query and FIG. 14 exposes a result of the latter query. In particular, FIG. 13 represents only the items "Pen" and "Bike" for "France", only the item "Dress" for "United Kingdom", and only the items "Computer" and "Motorbike" for "U.S.A.".

As in FIG. 13, FIG. 14 represents only the items "Pen" and "Bike" for "France", only the item "Dress" for "United Kingdom", and only the items "Computer" and "Motorbike" for "U.S.A.". FIG. 14 also represents the items "Pen", "Bike" and "Dress" for "Europe", and the items "Computer" and "Motorbike" for "North America". Notably, the Sales Amount associated with "Europe" in FIG. 14 is not equal to the sum of Sales Amounts associated with "France" and "United Kingdom". Rather, and in accordance with the intended semantics of the query, the Sales Amount associated with "Europe" includes all local sales of locally-designed items at the continent level (i.e., including the sale in France of a dress designed in the United Kingdom).

Embodiments described herein are solely for the purpose of illustration. Those in the art will recognize other embodiments may be practiced with modifications and alterations to that described above.

What is claimed is:

1. A non-transitory computer-readable medium having program code stored thereon, the program code executable by a computer to provide:
   an abstraction layer comprising:
      a first analysis object comprising an association to a first dimension object;
      a second analysis object comprising an association to a second dimension object;
      a third analysis object comprising an association to a third dimension object,
      wherein the first dimension object comprises one or more properties associating the first dimension object with the second dimension object, and
      wherein the second dimension object comprises one or more properties associating the second dimension object with the third dimension object,
   wherein the first dimension object and the second dimension object are mapped to logical entities of a logical database schema,
   wherein the logical entities of the logical database schema are mapped to tables of a database,
   wherein the logical database schema associates a first logical entity of the logical entities to a second logical entity of the logical entities, and associates a third logical entity of the logical entities to the second logical entity of the logical entities, and
   wherein the first dimension object is mapped to the first logical entity, the second dimension object is mapped to the second logical entity, and the third dimension object is mapped to the third logical entity.

2. A medium according to claim 1,
   wherein the first analysis object comprises a key to the first dimension object, and
   wherein the second analysis object comprises a key to the second dimension object.

3. A medium according to claim 1, wherein the second dimension object comprises a property associating the second dimension object with a fourth dimension object.

4. A system comprising:
   a database storing data tables; and
   a hardware device implementing:
      a logical database schema of logical entities associated with the data tables; and
   an abstraction layer comprising:
      a first analysis object comprising an association to a first dimension object;
      a second analysis object comprising an association to a second dimension object; and
      a third analysis object comprising an association to a third dimension object,
      wherein the first dimension object comprises one or more properties associating the first dimension object with the second dimension object,
      wherein the second dimension object comprises one or more properties associating the second dimension object with the third dimension object,
      wherein the first dimension object and the second dimension object are mapped to the logical entities,
      wherein the logical database schema associates a first logical entity of the logical entities to a second logical entity of the logical entities, and associates a third logical entity of the logical entities to the second logical entity of the logical entities, and wherein the first dimension object is mapped to the first logical entity, the second dimension object is mapped to the second logical entity, and the third dimension object is mapped to the third logical entity.

5. A system according to claim 4,
wherein the first analysis object comprises a key to the first dimension object; and wherein the second analysis object comprises a key to the second dimension object.

6. A system according to claim 4, wherein the second dimension object comprises a property associating the second dimension object with a fourth dimension object.

* * * * *